Sept. 3, 1929.  A. W. KOEPSELL  1,726,572
OIL HEATING DEVICE
Filed Oct. 6, 1926
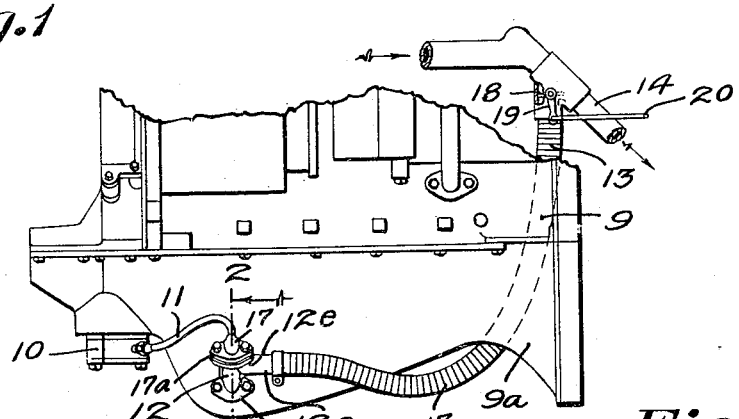
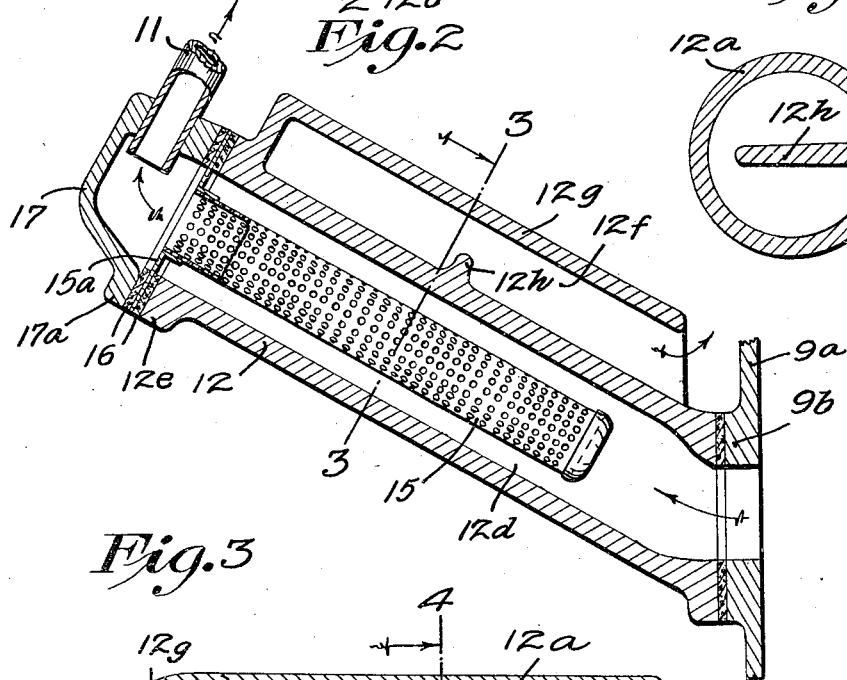
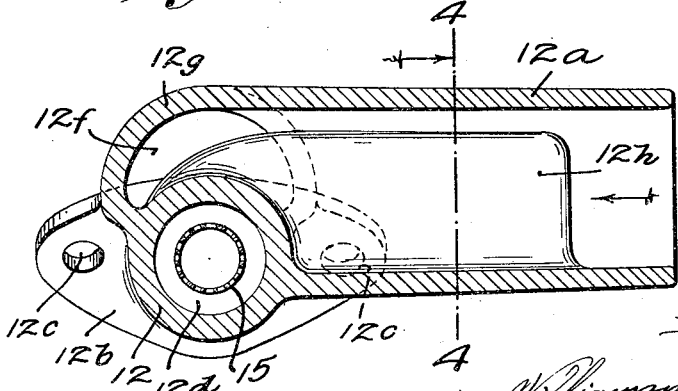

Patented Sept. 3, 1929.

1,726,572

UNITED STATES PATENT OFFICE.

ALFRED W. KOEPSELL, OF WORTHINGTON, MINNESOTA.

OIL-HEATING DEVICE.

Application filed October 6, 1926. Serial No. 139,835.

This invention relates to an oil heating device for internal combustion engines, particularly adapted for use on automobile engines. As is well known, the lubricating oil in automobile engines collects in the crank case and is usually taken from the crank case by a suitable pump and delivered to the bearings of the engine or the lubricating system for the engine. In warm weather the oil remains perfectly fluid and no difficulty is experienced with the lubrication. In cold weather, however, the low temperature increases the viscosity of the oil, causing it to become sluggish in action, so that it does not flow freely to the pump. Sufficient oil is thus not delivered to the engine and the bearings are thus often overheated. A screen is usually interposed between the intake of the pump and the crank case, and in cold weather this screen often becomes frosted by the moisture in the crank case and in the oil, so that it is difficult for any oil to pass therethrough into the pump. It is desirable, therefore, to have heat supplied to the oil in cold weather so that it will remain perfectly fluid and the same can be effectively delivered to the lubricating system.

It is an object of this invention to provide a simple and efficient heating device in the form of an attachment adapted to be secured to the crank case of an automobile where the usual pump connection is secured, which device is adapted to receive the pump connection usually secured to the crank case, said device having a chamber into which the oil flows from the crank case and having another chamber extending about said chamber, adapted to be connected by a suitable conduit to the exhaust conduit of the engine.

It is a further object of the invention to provide a simple and efficient oil heating device comprising a member adapted to be secured to the crank case and having a chamber communicating therewith, into which oil may flow from the crank case, said member being adapted to receive at its other end a connection to the oil pump and having a chamber extending about said chamber, having means adapted to be connected to a conduit extending to and communicating with the exhaust conduit of the engine, said last mentioned chamber having an open end directed toward and disposed close to the crank case.

It is still another object of the invention to provide a simple and efficient oil heater comprising a member adapted to be secured to the side of the crank case, and having an elongated chamber therein communicating with the crank case, a screen disposed in said chamber and opening adjacent one end thereof, said member having a pump connection at said latter end for connecting said chamber to the oil pump, said member also having a chamber extending about said chamber with an arm extending therefrom adapted to receive a conduit connecting said latter chamber to the exhaust conduit of the engine, said arm preferably having a baffle means therein.

These and other objects and advantages of the invention will be fully set forth in the following description made in connection with the accompanying drawings, in which like reference characters refer to similar parts throughout the several views and in which:—

Fig. 1 is a view in side elevation of the crank case of an automobile engine, showing a part of the exhaust conduit and having the invention applied thereto;

Fig. 2 is a vertical section taken on line 2—2 of Fig. 1, as indicated by the arrow;

Fig. 3 is a vertical section taken on line 3—3 of Fig. 2, as indicated by the arrow; and Fig. 4 is a vertical section taken on line 4—4 of Fig. 3.

Referring to the drawings, in Fig. 1 the crank case 9 of an automobile is shown, having the lower section $9^a$ in which the oil used for lubricating the engine collects. A pump 10 is secured to the front and lower part of the crank case and has its intake portion secured by a conduit 11 to a casing 12 which is in turn secured to the crank case 9 of the engine. The casing 12 has a laterally projecting hollow arm $12^a$ which is connected by a conduit 13 to the exhaust conduit 14 of the engine. The casing 12 is of elongated form and has a flange $12^b$ at one end adapted to fit against and be secured to the boss $9^b$, which, in the usual standard construction, is provided on the crank case, and to which the connection for the conduit 11 extending to the pump is usually secured. The flange $12^b$ has suitable bolt holes $12^c$ through which attaching bolts or screws extend, securing said flange to the crank case. The holes $12^c$ are preferably spaced the same as the holes in the standard pump connection, so that the attaching bolts can use the same tapped holes in the boss $9^b$ commonly used for the screws holding the pump connection. The member 12 has an elongated chamber $12^d$ therein opening at its lower end through the flange $12^b$, which opening preferably is somewhat smaller than the diameter of the chamber $12^d$ and substantially the same as the opening through the boss $9^b$. The chamber $12^d$ thus communicates with the crank case and oil may flow thereinto from the crank case. The level of the oil in the crank case is usually above the top of the member 12, so that chamber $12^d$ will be entirely filled with oil. A screen cylinder 15 is disposed in the chamber $12^d$ having a flange $15^a$ at its upper end disposed between gaskets 16, which gaskets and flange are securely held between the upper flange $12^e$ of the member 12 and the flange $17^a$ of the pump connection 17, the latter being secured to the flange $12^e$ by suitable bolts or screws as shown in Fig. 1. The interior of the screen cylinder 15 therefore communicates with the chamber in member 17 and the conduit 11 communicates with said chamber. The member 12 also has a chamber $12^f$ formed therein extending partially about the wall of the chamber $12^d$ and the hollow arm $12^a$ extending from one side of the member 12 communicates with the chamber $12^f$. The wall $12^g$ forming the outer side of the chamber $12^f$ is substantially semi-circular in outline, as shown in Fig. 3. The chamber $12^f$ is open at its end adjacent the flange $12^b$, as shown in Fig. 2 and this open end is directed towards and thus is in close proximity to the side of the crank case 9. The arm $12^a$ preferably has a baffle rib or plate $12^h$ extending longitudinally thereof as shown in Figs. 2, 3 and 4. A valve 18 is disposed in the exhaust conduit 14 adapted to extend across said conduit and direct the exhaust gases into the conduit 13 when desired. The valve 18 has an arm 19 secured thereto which will be connected by a suitable link 20 to some means disposed in convenient position for manipulation by the driver of the automobile.

In operation the engine will be operated and the valve 18 positioned so that the exhaust gases passing through the conduit 14 as indicated by the arrow in Fig. 1 will be largely deflected into the conduit 13. These gases will pass into the arm $12^a$ and into the chamber $12^f$ and the wall of the chamber $12^d$ will thus be highly heated. This will heat the oil in chamber $12^d$ and cause the same to be very fluid. The gases passing into arm $12^a$ will pass through the chamber $12^f$ and out at the open lower end thereof and will be directed against the side of the crank case 9 so that the portion of said crank case adjacent the opening or port in flange $9^b$ will also be heated. The oil in the crank case adjacent said port or opening will thus be heated and the same can readily flow into the chamber $12^d$. The pump 10 will be operated as usual and the oil will be drawn from the chamber $12^d$ through the screen or perforated cylinder 15 into the connection 17 and to the pump 10 through the conduit 11. The suction of the pump 10 will also tend to draw the oil into the chamber $12^d$ so that the device does not depend entirely upon gravity for the oil to flow into said chamber. The baffle plate $12^h$ will also absorb heat and tend to heat the wall of the chamber $12^d$. The oil will thus be quickly heated in cold weather, and kept very fluid so that there will be no danger of an insufficient supply of oil being delivered to the engine. The screen 15 will also be heated and there will be no danger of frost or hard oil collecting on this screen and preventing the flow of oil therethrough.

From the above description it is seen that applicant has provided a very simple and efficient oil heating device and one which can readily be installed on standard cars. It will be seen that a comparatively small portion of oil is taken into the chamber $12^d$ from the crank case. This small portion of oil is readily heated by the gases passing through the chamber $12^f$. It is thus not necessary to heat the large quantity of oil contained in the crank case, as has been attempted in some prior oil heating devices. Furthermore, the portion of the crank case to which the member 12 is attached is also heated, so that the oil adjacent the boss $9^b$ will be heated and can thus flow into the chamber $12^d$ or be drawn thereinto by the pump. By heating the small quantity of oil, the engine will thus be sure to have sufficient oil for lubrication.

It will also be noted that there is no small conduit or pipe connecting applicant's member 12 with the crank case, but said member is connected directly thereto. There is thus no chance of oil becoming hard in such a small pipe or conduit. Furthermore, as above stated, the point of connection is heated by applicant's device, insuring a flow of oil thereinto. The particular make of car illustrated is the well known Dodge automobile, but the invention is also applicable to other makes.

In order to install the device, it is only necessary to remove the pump connection on the side of the crank case which is very similar to, or the same as, the connection 17. The member 12 is then secured to the crank case instead of said connection and said connection is secured to the end of member 12, the pipe 11 being used as before. The conduit 13 is then provided and attached to the arm $12^a$ and the exhaust conduit. It is thus seen that substantially no change is necessary in the standard make of car to install the device. The oil is filtered and kept clean by passing through the screen 15 and said screen, as above stated, is heated so that the same will not become clogged. The parts of the device are quite few and simple and can be readily made and attached. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. An oil heater for an internal combustion engine having in combination with the oil pump and the crank case of said engine, a hollow member with a solid wall having an open end attached to the crank case and communicating therewith and adapted to receive a small quantity of oil from said crank case and separated therefrom, means disposed without the crank case for heating said member, and means for connecting said member to said oil pump for withdrawing oil from said member.

2. An oil heater for an internal combustion engine having in combination with the exhaust conduit, the oil pump and the crank case of said engine, a casing having an imperforate wall and an open end, said casing being attached at its open end to the side of said crank case, said crank case having an opening communicating with said open end so that oil may flow from said crank case into said casing, a casing extending about said casing and connected to said exhaust conduit for heating said casing and the oil therein, and means for connecting the end of said casing remote from said crank case to said oil pump.

3. An oil heating device for an internal combustion engine having in combination with the oil pump and the crank case of said engine, a casing having a chamber therein and having an open end, said casing being attached to the crank case at said open end and covering an opening in said crank case, whereby the chamber in said casing communicates with said crank case, means for heating said casing from said exhaust conduit, a perforated member disposed in said casing and separated from the walls thereof, said casing having a chamber at its end remote from the crank case, said perforated member, having an open end communicating with said last mentioned chamber, and a conduit connecting said last mentioned chamber to said oil pump.

4. An oil heater for an internal combustion engine, comprising in combination with the exhaust conduit, the oil pump and the crank case of said engine having lubricating oil therein, a member attached to the crank case and having a chamber communicating therewith, so that oil may flow into said chamber, a connection at the other end of said member connected to said pump, a chamber in said member extending about said first mentioned chamber, and a conduit secured to said member communicating with said latter chamber and extending to said exhaust conduit.

5. The structure set forth in claim 4, said last mentioned chamber having an open end directed toward and in close proximity to the side of the crank case.

6. An oil heater for an internal combustion engine, comprising in combination with the exhaust conduit, oil pump and crank case of said engine, which crank case has an apertured boss thereon for the attachment of the pump connection, a member adapted to be secured at one end to said boss, and having a chamber therein communicating with the crank case whereby oil may flow into said chamber, the other end of said member having means adapted to have secured thereto a pump connection extending to said pump, a second chamber in said member extending about said chamber, said member having an arm adapted to receive a conduit communicating with said last mentioned chamber and extending to and connected to the exhaust conduit of the engine.

7. An oil heater for an internal combustion engine, comprising in combination with the exhaust conduit, oil, pump and crank case of said engine, a member secured to the side of said crank case having an elongated chamber therein communicating with said crank case, whereby oil may flow into said chamber, a screen disposed in said chamber, a pump connection secured to said member, a conduit connecting said pump connection to said oil pump, said member having an elongated chamber extending about one side of said first mentioned chamber, a conduit connected to said last mentioned chamber and extending to said exhaust conduit of the engine, said last mentioned chamber having an opening to the atmosphere.

8. An oil heater for an internal combustion engine, comprising in combination with the exhaust conduit, crank case and oil pump, a casing having flanges at the ends thereof, one of which is adapted to be attached to the crank case, a chamber extending between said flanges communicating with said crank case, so that oil may flow from said crank case thereinto, an elongated cylindrical screen disposed in said chamber and having a flange at one end extending across said other flange, a pump connection having a flange secured to the said other flange on said member, said flange on said screen being between the flanges on said member and connection respectively, a conduit extending from said connection to said pump, said member having a heating chamber extending about said first mentioned chamber, and a conduit extending from said last mentioned chamber to said exhaust conduit of the engine.

9. The structure set forth in claim 8, said member having a hollow arm extending therefrom between said flanges, and having a baffle plate therein, said last mentioned conduit being connected to said arm.

10. An oil heating attachment for an internal combustion engine, comprising a casing having an elongated chamber extending therethrough, flanges at the end of said casing, one of which is adapted to be attached to the crank case of said engine, and the other of which is adapted to have a pump connection attached thereto, said member having a chamber extending about one side of said chamber and having a hollow arm extending from an intermediate portion thereof, communicating with said last mentioned chamber, said last mentioned chamber being open adajcent said first mentioned flange.

11. An oil heating attachment for an internal combustion engine, comprising a casing having an elongated chamber extending therethrough, flanges at the end of said casing, one of which is adapted to be attached to the crank case of said engine, and the other of which is adapted to have a pump connection attached thereto, said member having a chamber extending about one side of said chamber and having a hollow arm extending from an intermediate portion thereof, communicating with said last mentioned chamber, said last mentioned chamber being open adjacent said first mentioned flange, and said arm having a baffle plate extending partially thereacross.

12. An oil heating attachment for an internal combustion engine comprising in combination with the oil pump and crank case of said engine, a member secured to the side of said crank case, disposed outside thereof and extending upwardly therefrom, said member having a chamber therein adapted to have a small quantity of oil flow thereinto from the crank case, a connection from said chamber to said pump, said member also having a heating chamber extending about said chamber, and a conduit of comparatively large cross section extending from said last mentioned chamber to the exhaust manifold of the engine.

In testimony whereof I affix my signature.

ALFRED W. KOEPSELL.